United States Patent
Goldstein et al.

(10) Patent No.: US 12,432,020 B2
(45) Date of Patent: Sep. 30, 2025

(54) CORRECTION OF DOWNLINK RADIO FRAME MISALIGNMENT FOR COORDINATED MULTI-POINT TRANSMISSION/RECEPTION BY PHASE ROTATION

(71) Applicant: Dell Products L.P., Round Rock, TX (US)

(72) Inventors: Eran Goldstein, Montreal (CA); Ilya Portnik, Ashton (CA); Evgeny Paltin, Montreal (CA); Jayaram Venguduswamy Srinivasan, Nepean (CA)

(73) Assignee: Dell Products L.P., Round Rock, TX (US)

( * ) Notice: Subject to any disclaimer, the term of this patent is extended or adjusted under 35 U.S.C. 154(b) by 285 days.

(21) Appl. No.: 18/185,882

(22) Filed: Mar. 17, 2023

(65) Prior Publication Data
US 2024/0313910 A1    Sep. 19, 2024

(51) Int. Cl.
*H04W 56/00* (2009.01)
*H04L 5/00* (2006.01)

(52) U.S. Cl.
CPC ......... *H04L 5/0035* (2013.01); *H04L 5/0051* (2013.01); *H04W 56/0045* (2013.01)

(58) Field of Classification Search
None
See application file for complete search history.

(56) References Cited

U.S. PATENT DOCUMENTS 8,675,482 B1 * 3/2014 Lu ............... H04B 1/7115
370/252
9,402,255 B2 * 7/2016 Löhr ............. H04W 36/08
(Continued)

FOREIGN PATENT DOCUMENTS

EP     2 391 159 B1    6/2019
EP     2 870 813 B1    6/2021

OTHER PUBLICATIONS

3GPP "5G; NR; Physical channels and modulation (3GPP TS 38.211 version 16.7.0 Release 16)" Oct. 2021, https://www.etsi.org/deliver/, 138 pages.

(Continued)

*Primary Examiner* — Brandon M Renner
(74) *Attorney, Agent, or Firm* — Amin, Turocy & Watson, LLP

(57) ABSTRACT

Correction of downlink radio frame misalignment for coordinated multi-point transmission/reception (COMP) by phase rotation is described herein. A method as described herein can include estimating a time offset between a first time, at which a first transmission is received by a user equipment (UE) from a first cell, and a second time, at which a second transmission is received by the UE from a second cell; determining a phase rotation value based on the time offset; and adjusting a first phase of a third transmission, to be transmitted by the first cell to the UE, relative to the first transmission based on the phase rotation value, resulting in the first phase of the third transmission being aligned with a second phase of a fourth transmission, to be transmitted by the second cell to the UE and offset in time relative to the third transmission by the time offset.

20 Claims, 9 Drawing Sheets

(56) References Cited

U.S. PATENT DOCUMENTS

| | | |
|---|---|---|
| 2003/0117980 A1 | 6/2003 | Kim et al. |
| 2005/0120097 A1 | 6/2005 | Walton et al. |
| 2010/0265904 A1 | 10/2010 | Yang et al. |
| 2013/0083780 A1* | 4/2013 | Luo .................. H04L 5/0051 370/336 |
| 2013/0242952 A1* | 9/2013 | Chu .................. H04W 72/0446 370/336 |
| 2014/0140315 A1 | 5/2014 | Kim et al. |
| 2017/0093538 A1* | 3/2017 | Yoon .................. H04L 5/0048 |
| 2017/0230931 A1 | 8/2017 | Ubeda Castellanos et al. |
| 2018/0279339 A1 | 9/2018 | Löhr et al. |
| 2019/0141590 A1 | 5/2019 | Li et al. |
| 2019/0261189 A1 | 8/2019 | Huang et al. |
| 2020/0112953 A1 | 4/2020 | Bendlin et al. |
| 2020/0177287 A1* | 6/2020 | Yu .................. H04B 7/0617 |
| 2022/0182957 A1 | 6/2022 | Laddu et al. |
| 2022/0386337 A1 | 12/2022 | Hao et al. |
| 2023/0224839 A1 | 7/2023 | Park et al. |
| 2023/0389015 A1 | 11/2023 | Sandberg |
| 2023/0422238 A1 | 12/2023 | Kazmi et al. |
| 2024/0137073 A1* | 4/2024 | Wang .................. H04B 7/026 |
| 2024/0224206 A1 | 7/2024 | Liu et al. |
| 2025/0024393 A1 | 1/2025 | Abreu et al. |

OTHER PUBLICATIONS

3GPP "5G; NR; Multiplexing and channel coding (3GPP TS 38.212 version 15.2.0 Release 15)" Jul. 2018, https://www.etsi.org/deliver/etsi_ts/138200_138299/138212/15.02.00_60/ts_138212v150200p.pdf, 101 pages.

3GPP "5G; NR; Physical layer procedures for control (3GPP TS 38.213 version 16.2.0 Release 16)" Jul. 2020, https://www.etsi.org/deliver/etsi_ts/138200_138299/138213/16.02.00_60/ts_138213v160200p.pdf, 180 pages.

International Search Report and Written Opinion received for PCT Application Serial No. PCT/US2023/035957 dated Feb. 22, 2024, 13 pages.

Notice of Allowance received for U.S. Appl. No. 18/155,462 dated Jul. 30, 2025, 10 pages.

Non-Final Office Action received for U.S. Appl. No. 18/155,462 dated Jun. 9, 2025, 19 pages.

International Preliminary Report on Patentability received for PCT Application Serial No. PCT/US2023/035957 dated Jul. 31, 2025, 8 pages.

* cited by examiner

CORRECTION OF DOWNLINK RADIO FRAME MISALIGNMENT FOR COORDINATED MULTI-POINT TRANSMISSION/RECEPTION BY PHASE ROTATION

BACKGROUND

In coordinated multi-point transmission/reception (COMP), cells can be assigned, including dynamically, to support other cells via multiple transmission and reception points (mTRP). This can be done, e.g., to increase the power of received downlink transmissions, corresponding to increased throughput and coverage. In general, with COMP, multiple cells use the same scrambling sequence, whereby a user equipment (UE) perceives the multiple cells as one cell. This is in contrast to a UE operating in a dual connectivity mode where the multiple cells are perceived as two or more cells. A cell that is assigned to assist the main cell by transmitting an additional downlink signal using the same scrambling sequence is referred to herein as a "cooperating" (or sometimes "assisting" or "supporting") cell, whereas the original cell to which a user equipment (UE) is connected is referred to herein as a "connected" cell.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a system is described herein. The system can include a memory that stores executable components and a processor that executes the executable components stored in the memory. The executable components can include an offset estimation component that determines an estimated time offset between a first time, at which a user equipment (UE) receives a first transmission from a first cell of a communication network, and a second time, at which the UE receives a second transmission from a second cell of the communication network. The executable components can also include a phase rotation component that adjusts a first phase of a third transmission, to be transmitted by the first cell to the UE, relative to the first transmission by a rotation amount determined as a function of the estimated time offset, resulting in the first phase of the third transmission being aligned with a second phase of a fourth transmission, to be transmitted by the second cell to the UE and offset in time relative to the third transmission by the estimated time offset.

In another implementation, a method is described herein. The method can include estimating, by a device including a processor, a time offset between a first time, at which a first transmission is received by a UE from a first cell of a communication network, and a second time, at which a second transmission is received by the UE from a second cell of the communication network. The method can further include determining, by the device, a phase rotation value based on the time offset. The method can further include adjusting, by the device, a first phase of a third transmission, to be transmitted by the first cell to the UE, relative to the first transmission based on the phase rotation value, resulting in the first phase of the third transmission being aligned with a second phase of a fourth transmission, to be transmitted by the second cell to the UE and offset in time relative to the third transmission by the time offset.

In an additional implementation, a non-transitory machine-readable medium including computer executable instructions is described herein. The instructions, when executed by a processor, can facilitate performance of operations including estimating a time offset between a first time, at which a first signal transmitted by a first cell of a communication network is received by a UE, and a second time, at which a second signal transmitted by a second cell of the communication network is received by the UE; and adjusting a first phase of a third signal, to be transmitted by the first cell to the UE, relative to the first signal by a phase offset determined based on the time offset, resulting in the first phase of the third signal being aligned with a second phase of a fourth signal, to be transmitted by the second cell to the UE and offset in time relative to the third signal by the time offset.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Various embodiments provided herein are discussed with reference to specific communication network types and/or technologies, such as a Fifth Generation (5G) New Radio (NR) network. However, it is noted that references to these specific network technologies are made solely for purposes of providing example network environments in which the embodiments described herein can operate. Unless explicitly stated otherwise, the below description and the claimed subject matter are not intended to be limited to any particular networking environment or technology.

Various implementations described herein are generally directed to correction of downlink radio frame misalignment for COMP via phase rotation. For instance, performance degradation in COMP scenarios can be reduced as described herein without a change in the time alignment of the downlink frame, but instead by performing fast phase rotation of the subcarriers according to their frequency, e.g., in order to negate the impact of delays associated with signals arriving at a user equipment (UE) from multiple cells. In this manner, the targeted UEs will not receive the orthogonal frequency division multiplexing (OFDM) symbols from different transmission and reception points (TRPs) and/or radio units (RUS) at the same desired time boundary; however, the received signal can be made to appear at the receiver port without the fast frequency-dependent phase rotation that prevents the creation of effective beamforming with the connected cell. Consequently, the network in the COMP configuration can improve its downlink throughput and/or coverage in some scenarios.

Note that as one benefit, the technology described herein does not require a UE to use or support dual connectivity to receive transmissions from the assisting cells, as the signals from multiple cells are perceived to come from a single, connected cell. Additionally, various implementations described herein can facilitate additional advantages that can improve the performance of a communication system and/or devices operating therein. These advantages can include, but are not limited to, the following. Ease of implementation can be improved, as RUs do not need to support fast changes in time alignment. Additionally, respective UEs can be assigned their own delay correction in the frequency domain, which can enable an OFDM symbol, or slot, to accommodate downlink transmissions to multiple UEs, each with its own delay. Other advantages are also possible.

Figure 1:
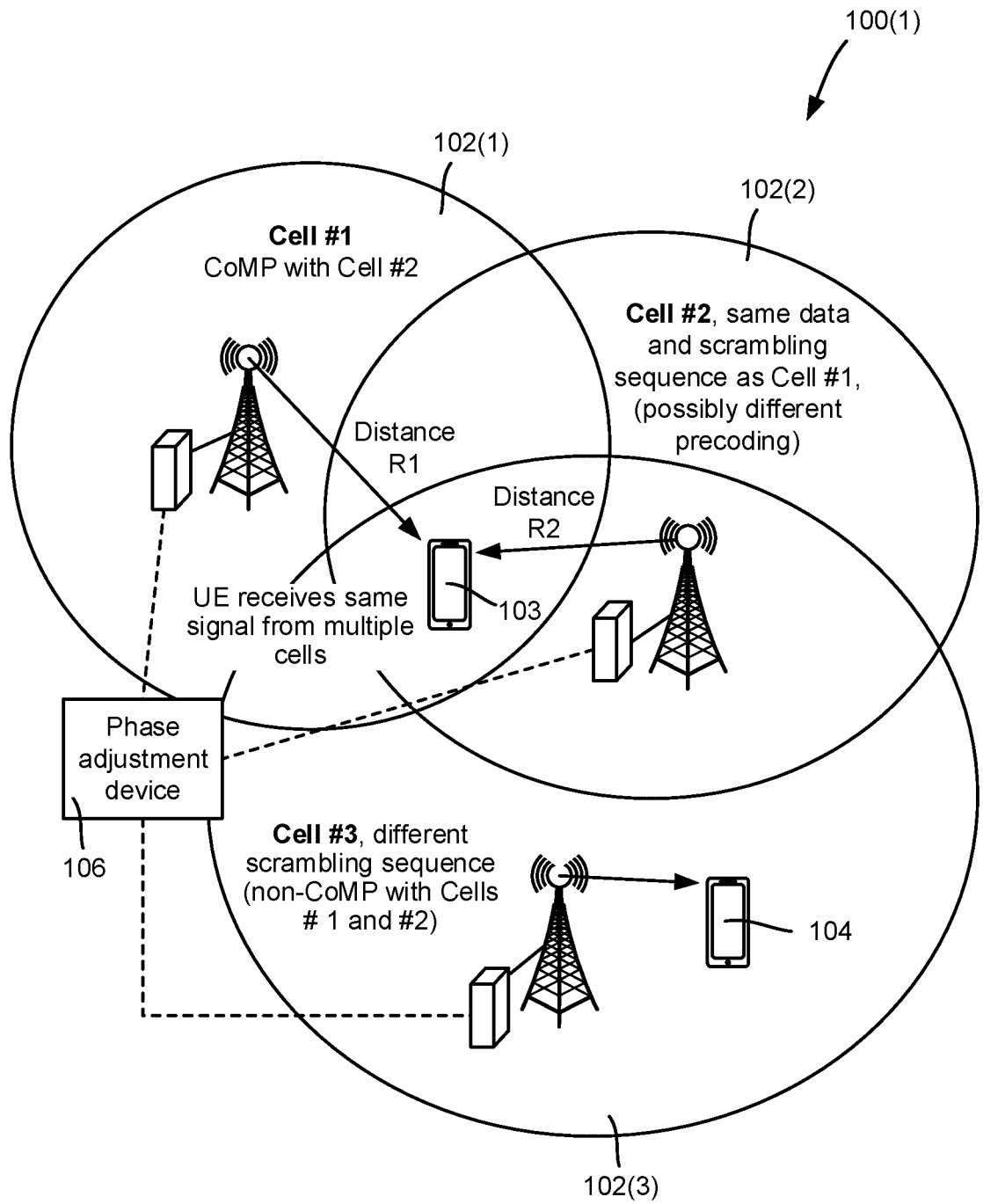
FIG. 1 is a diagram depicting respective example network cells, including two cells serving a user equipment (UE) in a coordinated multipoint transmission/reception (CoMP) mode, in accordance with various implementations described herein.

With reference now to the drawings, FIG. 1 is an example representation of a system/architecture 100(1) including three cells 102(1)-102(3) that are configured for COMP. In FIG. 1, cell 102(1) (referred to in FIG. 1 as cell #1) is the connected cell with respect to serving a UE 103 via CoMP, and is being assisted by cell 102(2) (referred to in FIG. 1 as cell #2) as the cooperating cell. Thus, cell 102(1) and cell 102(2) can cooperate to provide downlink services to the selected UE 103 with the same scrambling sequence, e.g., such that the UE 103 perceives the cells as a single downlink data source, generally with improved reception relative to data transmission from a single transmission point. Note that cell 102(3) (referred to in FIG. 1 as cell #3) is not cooperating while in the state depicted in FIG. 1. Stated another way, cell 102(3) can have a different scrambling sequence and/or be non-COMP with cells 102(1) and 102(2), and may, for example, be serving a different UE 104.

However, with time division duplexing (TDD) in a COMP scenario, the cells are usually synchronized. As a result, received downlink signals can present with a time misalignment based on the difference between the distances of each of the two radio units to the receiving UE, depicted as distances R1 and R2 in FIG. 1. This distance difference corresponds to a time difference ΔT, which can be expressed as $$\Delta T = \frac{(R2 - R1)}{C},$$

where C is the approximate speed of light.

When a receiver (e.g., the UE 103) experiences multiple signals combined on its antenna ports, the higher the time misalignment between the signals, the shorter the coherent bandwidth to create an effective beam. In other words, the two signals can switch from constructive to destructive interference, and transmission maximum-ratio combining (Tx MRC) can be lost. Additionally, if the signal time misalignment is larger than the cyclic prefix (CP) length, inter-symbol interference (ISI) can occur, further degrading the performance. Still further, the UE's channel estimation performance can also be degraded due to the assumption at the receiver that the signals are to arrive with a lower delay spread.

More particularly, when a signal is received at a time misalignment a rapid phase rotation is experienced in the frequency domain, which can prevent effective beamforming. For that reason, the third generation partnership project (3GPP) standard mandates that for MIMO transmission, at each carrier frequency, the time alignment error (TAE) is not to exceed 65 nanoseconds. Note that 65 nanoseconds is equivalent to approximately 19.5 meters assuming the speed of light propagation in a vacuum, which shows that even a small propagation distance difference can cause beam forming degradation.

As shown in FIG. 1, a phase adjustment device 106 can operate based on various implementations described herein to reduce, or even substantially eliminate, the effect of time misalignment as described above, e.g., by mitigating the impact of the rapid phase rotation noted above. The phase adjustment device can be incorporated into the communications network at the core network, at a centralized unit, at one or more distributed units, within one or more of the cells, as a standalone device, and/or in any other suitable manner. For instance, the phase adjustment device 106 can be utilized as part of a system comprised of radio units, distributed units, and/or central units (e.g., as defined in an Open Radio Access Network (O-RAN) architecture) that can benefit from various implementations as described herein, e.g., by improving coverage/throughput and reducing radio unit power consumption, both at the UE side and at the network side. Various operations that can be performed by the phase adjustment device 106 are described in further detail below with respect to FIGS. 6-8.

Note that FIG. 1 shows a connected cell 102(1) and a single cooperating (assisting) cell 102(2). However, this is only one example, more than one cooperating (assisting) cell could also transmit to the UEs. For example, cell 102(3) can, at least part of the time, use the same data and scrambling sequence as cell 102(1) and thereby act as an assisting cell during that time, in conjunction with the assistance from cell 102(2). In sum, there can be N assisting cells, where N is any practical number, with each one performing its own phase rotation according to its specific time difference.

Figure 2:
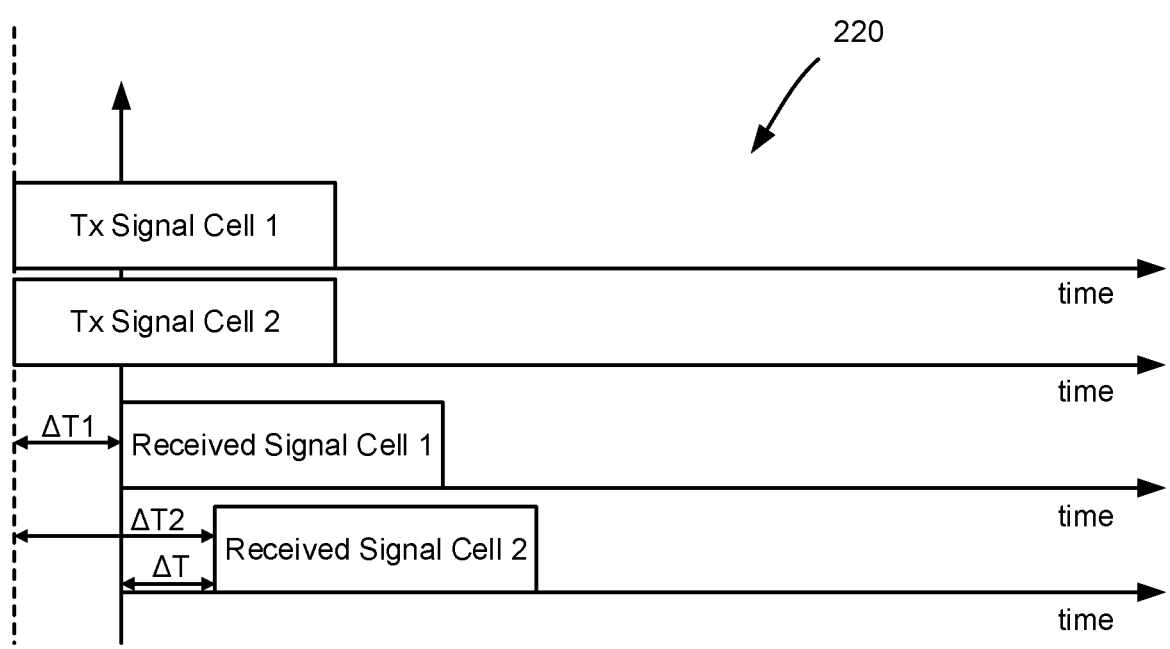
FIG. 2 is a diagram depicting time alignment of transmissions resulting in reception time misalignment at a UE in accordance with various implementations described herein.

By way of an example, consider the diagram 220 of FIG. 2, in which time alignment at the transmitting cells (Tx signal cell 1 and Tx signal cell 2) results in time misalignment at the UE upon reception of the received signal cell 1 relative to reception of the received signal cell 2. Such misalignment is generally due to the different propagation times from different radio units to the UE, corresponding to the difference between the distances R1 and R2 in the example of FIG. 1. Some amount of difference may also be due to different clocks; however, in TDD networks the expected time differences are relatively small.

As can be seen in diagram 220, the received signal from cell 1 is received after a delay ΔT1, which is less than the delay ΔT2 after which the signal from cell 2 is received. This difference ΔT1-ΔT2, resulting in a negative time alignment equal to ΔT, is obtained (e.g., determined) by the phase adjustment device 106, based on which an appropriate phase rotation can be applied.

Estimating the time alignment between respective signals can be done in a number of ways. For example, if UE positioning data (e.g., as obtained via the Fifth Generation (5G) New Radio (NR) standard and/or other suitable standards) is available, the network can use the positioning information to estimate the propagation distance difference ΔR=R2−R1 for the distances R1 and R2 shown in FIG. 1. Next, the time alignment ΔT to be applied at the assisting cell can be calculated as ΔT=ΔR/C, where C is the speed of light in a vacuum.

As another example, the assisting cell can estimate the time offset based on a uplink sounding reference signal (SRS) received from the UE. Assuming wide band uplink/downlink reciprocity, a delay ΔT at the received uplink signal means that the UE is farther away from the assisting cell by ΔR=ΔT*C compared to the connected cell. As a result, the downlink signal can be advanced by ΔT to achieve signal receiving alignment at the UE antenna ports. If, on the other hand, the assisting cell detects the uplink signal advanced by ΔT, then the downlink signal can instead be delayed by ΔT.

As a further example, the UE can explicitly send the perceived time misalignment of a group of channel state information reference signals (CSI-RS) sent from the assisting cell. In this example, the dedicated cell and the assisting cell can send their CSI-RS signals as appearing from the same cell, e.g., by using the same scrambling sequence but using different antenna ports. In addition, the UE could send CSI-RS containing the time alignment per CSI-RS panel, e.g., as compared to the panel index 0. The time alignment can be reported with the same resolution the cell is using to adjust the uplink transmission, e.g., $16 \cdot 64 \cdot T_c/2^\mu$. Additionally, the range of the report could be configured to optimize the channel bandwidth.

Any or all of the above techniques, as well as others, could be combined as well. For instance, various options could work in parallel to facilitate use of a fusion of information.

Figure 3A:
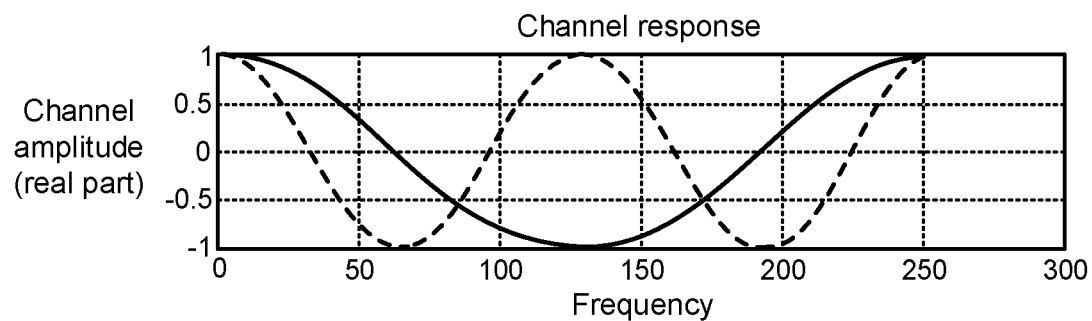
FIG. 3A is a diagram depicting channel amplitude versus frequency for two delays of the same signal in accordance with various implementations described herein.
Figure 3B:
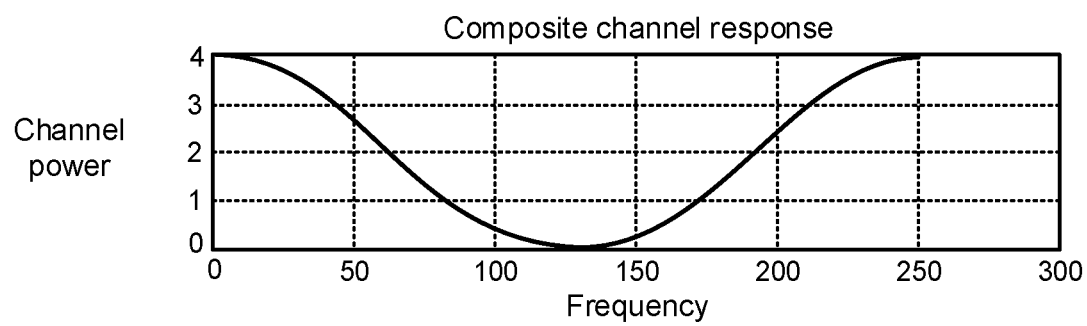
FIG. 3B is a diagram depicting channel power versus frequency of two signals prior to activating time-aligned constructive interference in accordance with various implementations described herein.
Figure 3C:
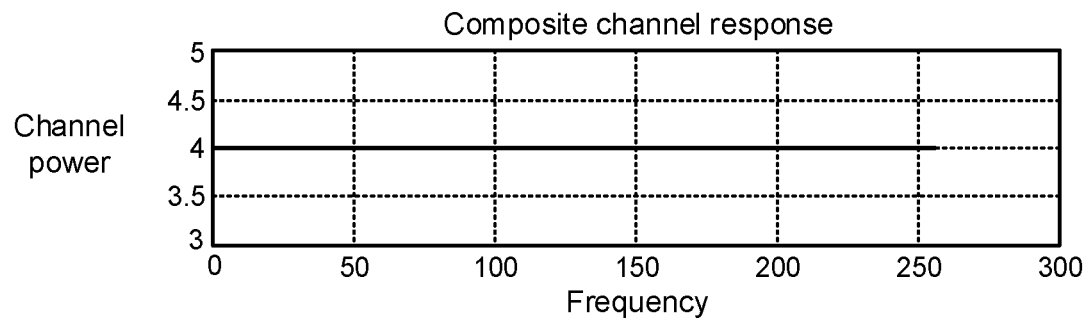
FIG. 3C is a diagram depicting channel power versus frequency of two signals after activating time-aligned constructive interference in accordance with various implementations described herein.

Alignment of signal reception as described above can result in increased power because of constructive interference of the two signals. Note that without alignment, two signals are rotating at a different rate in the frequency domain, whereby as generally shown in FIG. 3A there is no one phase correction that can align the two signals to have a constructive interference. Although without alignment on average the power increases, e.g., by a factor of two as shown by FIG. 3B, in which the power is dependent on frequency, this increase is less than when compared to a time-aligned constructive interference, which can increase the received power by a factor of four (for any frequency), as illustrated in FIG. 3C.

Figure 4:
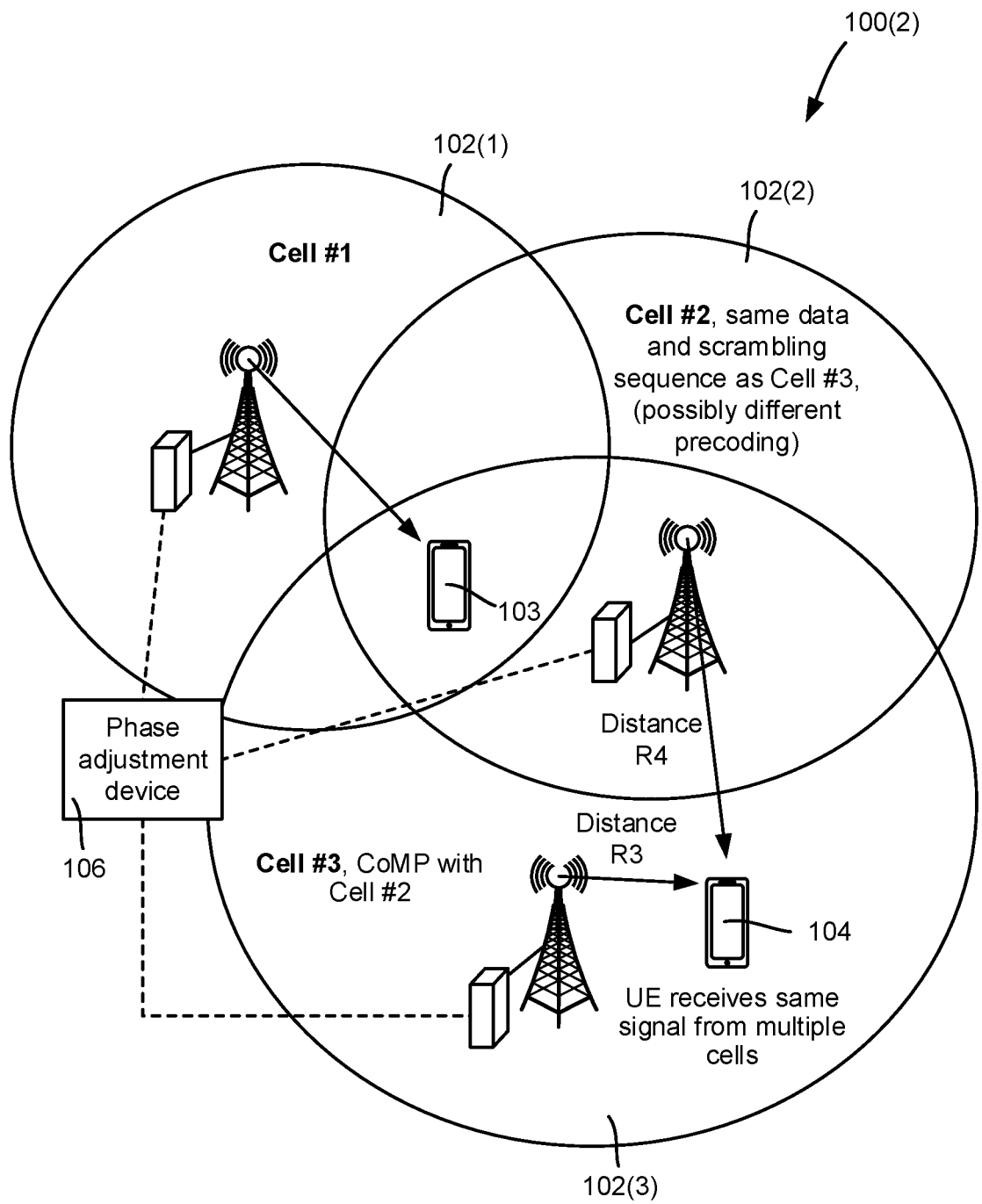
FIG. 4 is another diagram depicting respective example network cells, including two cells serving a user equipment (UE) in a coordinated multipoint transmission/reception (CoMP) mode, in accordance with various implementations described herein.

Turning to another aspect, which can be considered dynamic cooperation, in a next time interval (e.g., a defined number of slots or symbols), a cell can switch to serve one or more other selected UEs. For example, in the example shown by FIG. 1, cell 102(2) can engage in COMP communication with a UE 103. Subsequently, as shown by FIG. 4, cell 102(2) can cooperate with a different cell, e.g., cell 102(3), to transmit information to another UE 104.

Figure 5:
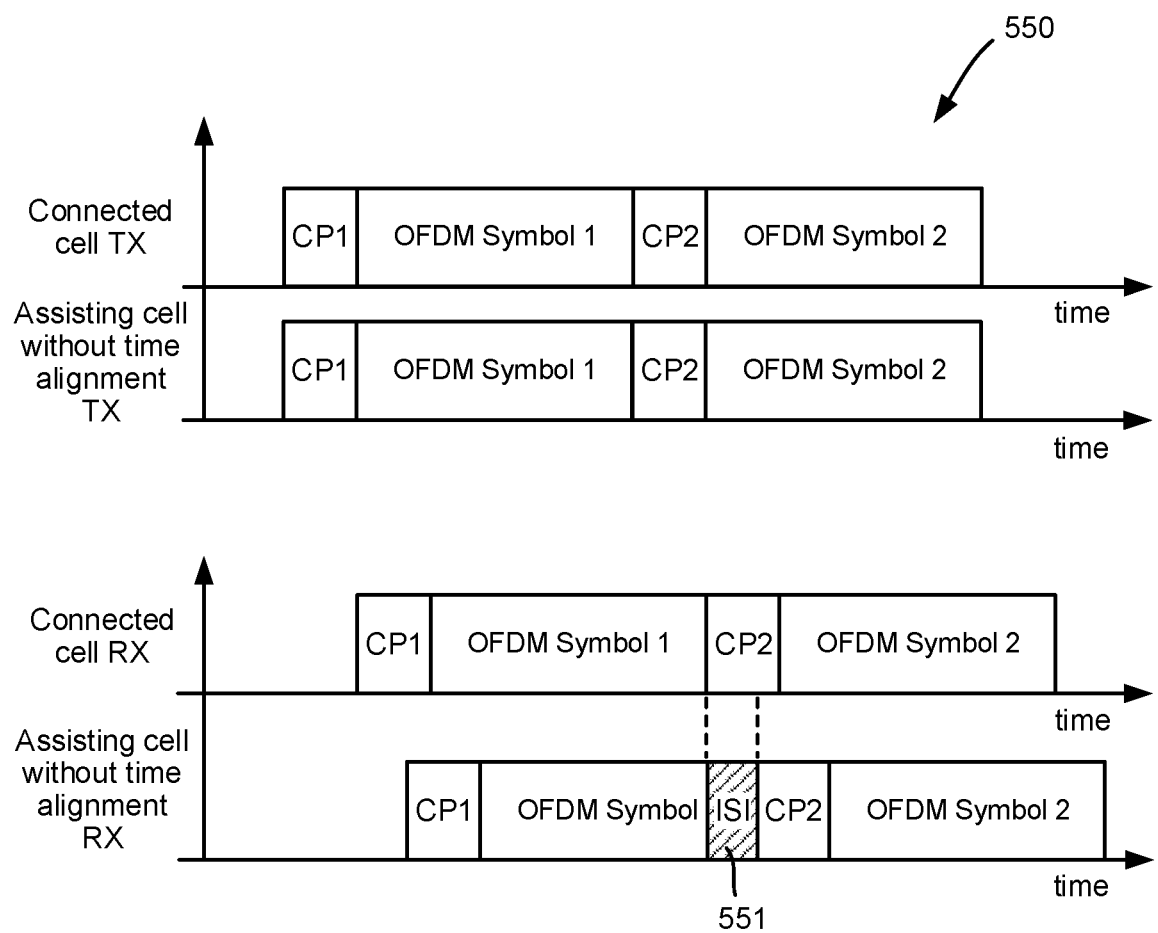
FIG. 5 is a diagram depicting time alignment of transmissions resulting in inter-symbol interference in accordance with various implementations described herein.

However, when a radio unit switches between cells a different time alignment may be desirable, as the downlink arrival time at the antenna ports of the UE could be different for each radio unit. As a consequence, the time misalignment of the received signals at the UE side could prevent the generation of an efficient beamforming, and can also result in inter-symbol interference (ISI) if the time misalignment is sufficiently large, e.g., larger than the cyclic prefix. As an example of ISI that can occur, diagram 550 in FIG. 5 illustrates that, in the event that the signals are received at the UE with a time misalignment larger than the CP duration, inter-symbol interference (ISI) results (as shown in the shaded block 551 timed between the CP2 of the subsequent reception from the connected cell and the OFDM symbols of the current reception from the assisting cell.

To mitigate the effects of time misalignment at the UE as described above, the phase adjustment device 106 can apply a phase rotation to signals transmitted by one or more cells engaged in COMP communication. For instance, in a communication that uses Cyclic-Prefix OFDM (CP-OFDM) for its downlink transmission, such as a Fourth Generation (4G) Long Term Evolution (LTE) system, a 5G NR system, etc., the phase adjustment device 106 can leverage various properties of CP-OFDM. For instance, a time delay in CP-OFDM is experienced as a phase rotation in the frequency domain, meaning that each resource element (RE) will experience a different phase shift according to the length of the delay and the RE frequency. This can be expressed as follows:

$$RE(k)_{delay, \Delta T} = RE(k) * \exp(j2\pi * k * F_{scs} * \Delta T),$$

where ΔT is the time delay and k is the OFDM subcarrier index, e.g., representing a quantized frequency, and $F_{scs}$ is the subcarrier frequency (e.g., 30 kHz, 50 kHz, etc.). The above assumes that the delay ΔT is smaller than the cyclic prefix.

From the above equation, it is noted that two copies of a signal with different delays will have different phases per RE, and therefore an effective beam will not be generated for a large bandwidth, e.g., as described above with respect to FIGS. 3A-3C. To mitigate this, an assisting cell, e.g., via a phase adjustment device 106 associated with the assisting cell, can apply inverse phase rotation per RE prior to its OFDM modulation (e.g., inverse fast Fourier transform (IFFT) and CP addition) as follows:

$$RE_{correction} = RE(k) * \exp(-j2\pi * k * F_{scs} * \Delta T).$$

As a result, the received signal can be perceived by the UE as without delay, as shown by the following:

$$\begin{aligned}E_{recieved} &= RE_{correction} * \exp(j2\pi * k * F_{scs} * \Delta T)\\ &= RE(k) * \exp(-j2\pi * k * F_{scs} * \Delta T) * \exp(j2\pi * k * F_{scs} * \Delta T)\\ &= RE(k)\end{aligned}$$

In an implementation, the phase rotation can be applied by the phase adjustment device 106 to the CSI-RS, Physical Downlink Shared Channel (PDSCH), and/or other signals meant for a target UE or group of UEs that share a similar location (and therefore a radio frequency (RF) channel). By negating the phase at the transmitter side, the UE will be able to experience only a residual slow changing low-resolution phase, which could be aligned between the assisting and connected phase by existing CSI reporting mechanisms.

Figure 6:
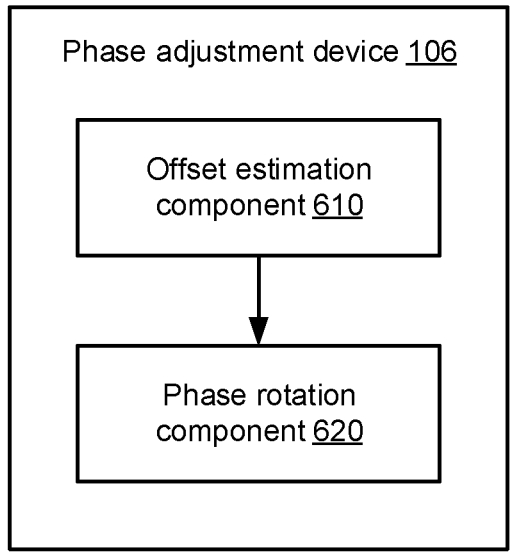
FIG. 6 is a block diagram of an example implementation of the phase adjustment device shown in FIG. 1 and FIG. 4.
Figure 7:
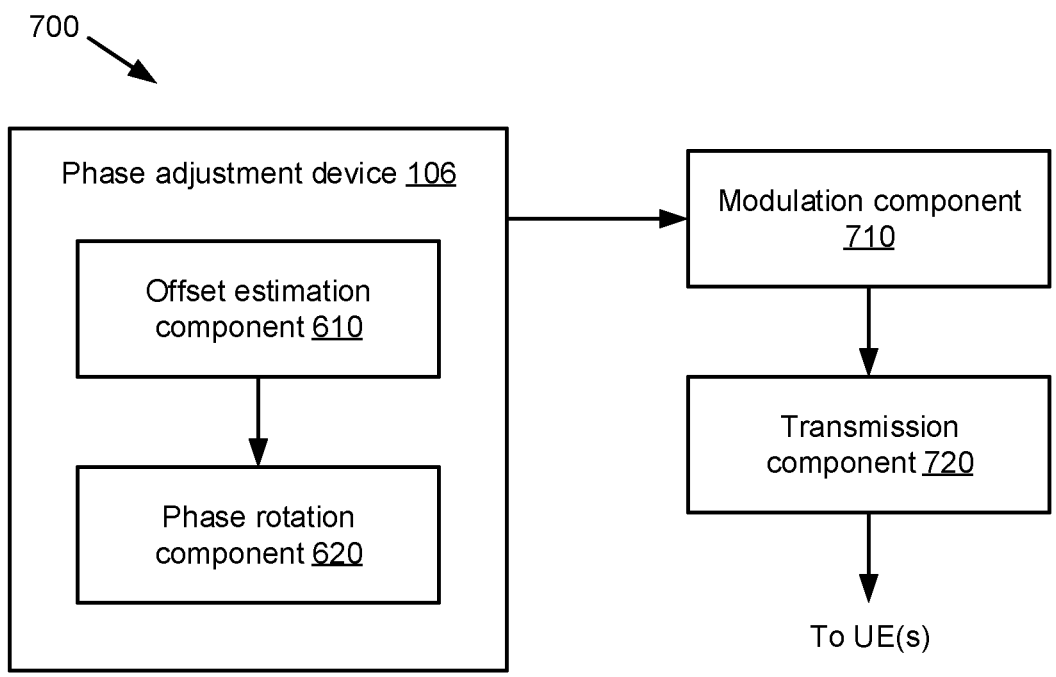
FIG. 7 is a block diagram of a system that facilitates modulation and transmission of phase-adjusted signals in accordance with various implementations described herein.
Figure 8:
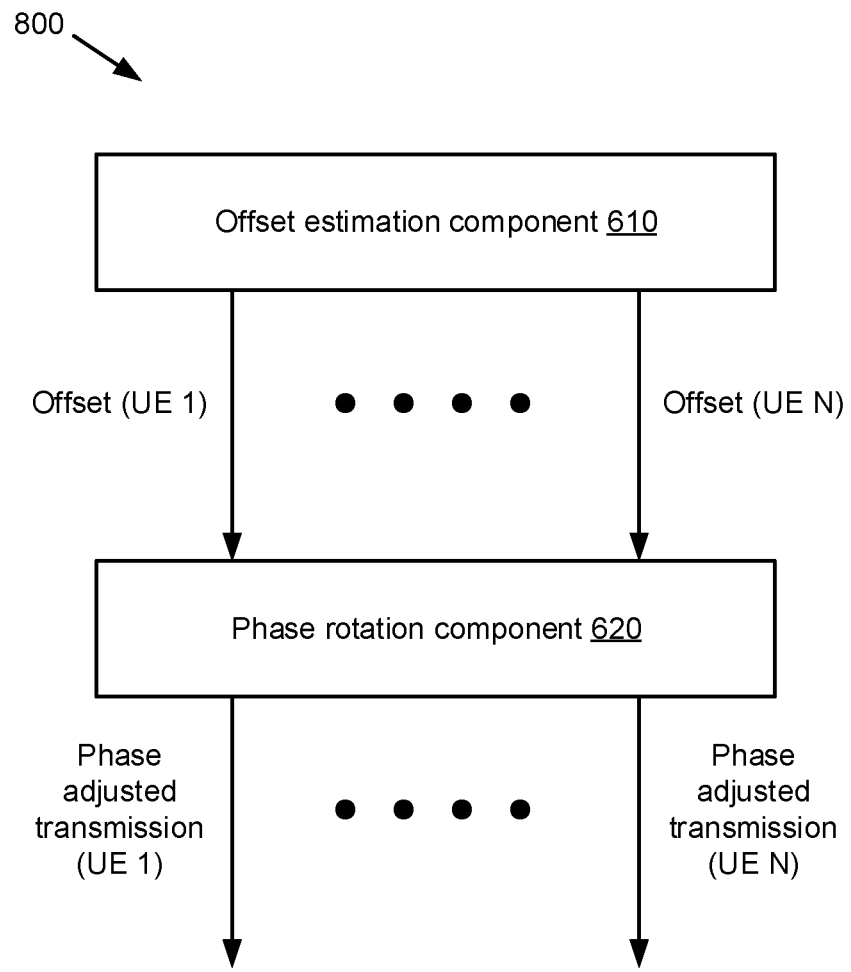
FIG. 8 is a block diagram of a system that facilitates transmission phase adjustment on a per-UE basis in accordance with various implementations described herein.

Turning now to FIGS. 6-8, various functions that can be performed by the phase adjustment device 106 and/or other devices, such as devices implemented via a cell associated with the phase adjustment device 106, are illustrated as logical components. In an implementation, the logical components shown in FIGS. 6-8 can be implemented in hardware, software, or a combination of hardware and software. By way of example, the illustrated components can be implemented as computer-executable components, e.g., components stored on a memory and executed by a processor. An example of a computer architecture including a processor and a memory that can be used to implement the various components presented herein is shown and described in further detail below with respect to FIG. 10.

Referring now to FIG. 6, an example implementation of the phase adjustment device 106 described above, e.g., with respect to FIGS. 1 and 4, is illustrated. The phase adjustment device 106 includes an offset estimation component 610 that determines an estimated time offset between a first time, at which a UE (e.g., UE 103 as shown in FIG. 1) receives a first transmission from a first cell of a communication network (e.g., an assisting cell 102(2) for the UE 103 as shown in FIG. 1), and a second time, at which the UE receives a second transmission from a second cell of the communication network (e.g., a connected cell 102(1) for the UE 103 as shown in FIG. 1).

The phase adjustment device 106 shown in FIG. 6 further includes a phase rotation component 620 that can adjust a phase of a third transmission, to be transmitted by the first (assisting) cell to the UE, relative to a phase of the first transmission by a rotation amount that is determined as a function of the estimated time offset determined by the offset estimation component 610. As a result of the phase adjustment performed by the phase rotation component 620, the phase of the third transmission can be aligned with a phase of a fourth transmission to be transmitted by the second (connected) cell to the UE, which is offset in time relative to the third transmission from the first (assisting) cell by the estimated time offset. In various implementations, the third transmission conducted by the first (assisting) cell can be a CSI-RS transmission, a PDSCH transmission, and/or any other suitable type of transmission.

In various implementations, the offset estimation component 610 can determine the estimated time offset between the first and second transmissions described above using one or more suitable techniques. For instance, the offset estimation component 610 can determine the estimated time offset based on a difference between a first distance from the first (assisting) cell to the UE and a second distance from the second (connected) cell to the UE, e.g., distances R1 and R2 shown in FIG. 1, respectively. As another example, the offset estimation component 610 can determine the estimated time offset based on a difference between a third time, at which an uplink SRS transmitted from the UE is received at the first (assisting) cell, and a fourth time, at which the uplink SRS is received at the second (connected) cell. As still another example, the offset estimation component 610 can determine the estimated time offset based on a time misalignment report and/or other information received from the UE in response to the UE receiving the first and second transmissions as described above. Other techniques are also possible.

By performing phase rotation via the phase rotation component 620, the phase of signals received from an assisting cell can be adjusted to match the phase of signals coming from a connected cell. This, in turn, can result in any interference between the two signals being constructive interference, thereby facilitating more consistent received signal energy levels.

While phase rotation as described above cannot fully mitigate the effects of misalignment in some cases due to ISI, such as cases in which time realignments are as large or larger than the cyclic prefix or cases in which negative delay is occurring (i.e., the assisting cell is arriving before the dedicated cell), phase rotation is a less computationally expensive operation than time realignment in cases where ISI is not a factor. Additionally, using phase rotation to correct time misalignment can enable different misalignment corrections for multiple UEs simultaneously, e.g., as will be described below with respect to FIG. 8. As another advantage of phase rotation, in the event that a transmission is associated with multiple resource elements, the phase adjustment device 106 can apply phase rotation on a per-resource element basis without affecting other transmissions or resource elements.

Turning next to FIG. 7, a block diagram of a system 700 that facilitates modulation and transmission of phase-adjusted signals is illustrated. Repetitive description of like elements employed in other embodiments described herein is omitted for brevity. System 700 as shown in FIG. 7 includes a phase adjustment device which can operate as described above with respect to FIG. 6. System 700 further includes a modulation component 710 that can modulate a transmission in response to the phase rotation component 620 of the phase adjustment device 106 applying phase adjustment to the transmission. Upon successful modulation of the transmission, the transmission can be provided to UEs and/or other devices via a transmission component 720.

In some implementations, the phase adjustment device 106, the modulation component 710, and the transmission component 720 can be implemented via the same device, e.g., a Node B or other device that provides communication service for a cell or other coverage area. Alternatively, the phase adjustment device 106 can be implemented via a separate device that is communicatively coupled to the modulation component 710 and the transmission component 720, e.g., via a wired or wireless connection.

With reference now to FIG. 8, a block diagram of a system 800 that facilitates transmission phase adjustment on a per-UE basis is illustrated. Repetitive description of like elements employed in other embodiments described herein is omitted for brevity. System 800 as shown in FIG. 8 includes an offset estimation component 610 and a phase rotation component 620 that can operate as described above with respect to FIG. 6. As the phase rotation component 620 can facilitate correction of time misalignment without performing a time realignment (e.g., a frame realignment), the phase rotation component 620 can perform phase rotation for different UEs at the same time (e.g., on the same slot) without needing to shift the time for other UEs. By way of example, the phase rotation component 620 can perform rotation for a UE for which system 800 is associated with an assisting cell while retaining an original transmission phase for UEs for which system 800 is associated with a connected cell.

In general, as shown in FIG. 8, different phase adjustments can be applied to different UEs simultaneously or near simultaneously. For instance, the phase rotation component 620 can adjust a transmission, to be transmitted by an associated cell to a first UE, by a first rotation amount and then rotate another transmission, to be transmitted by the cell to a different UE, by a second, different rotation amount. Phase offsets utilized by the phase rotation component 620 can be determined based on time offsets estimated by the offset estimation component 610 for each UE. For instance, a first phase offset for a first UE can be based on a first time offset, between a time at which a first UE receives a first signal from a first cell and a time at which the first UE receives a second signal from a second cell, and a second phase offset for a second UE can be based on a second time offset, between a time at which a second UE receives a third signal from the first cell and a time at which the second UE receives a fourth signal from the second cell or a third cell.

Figure 9:
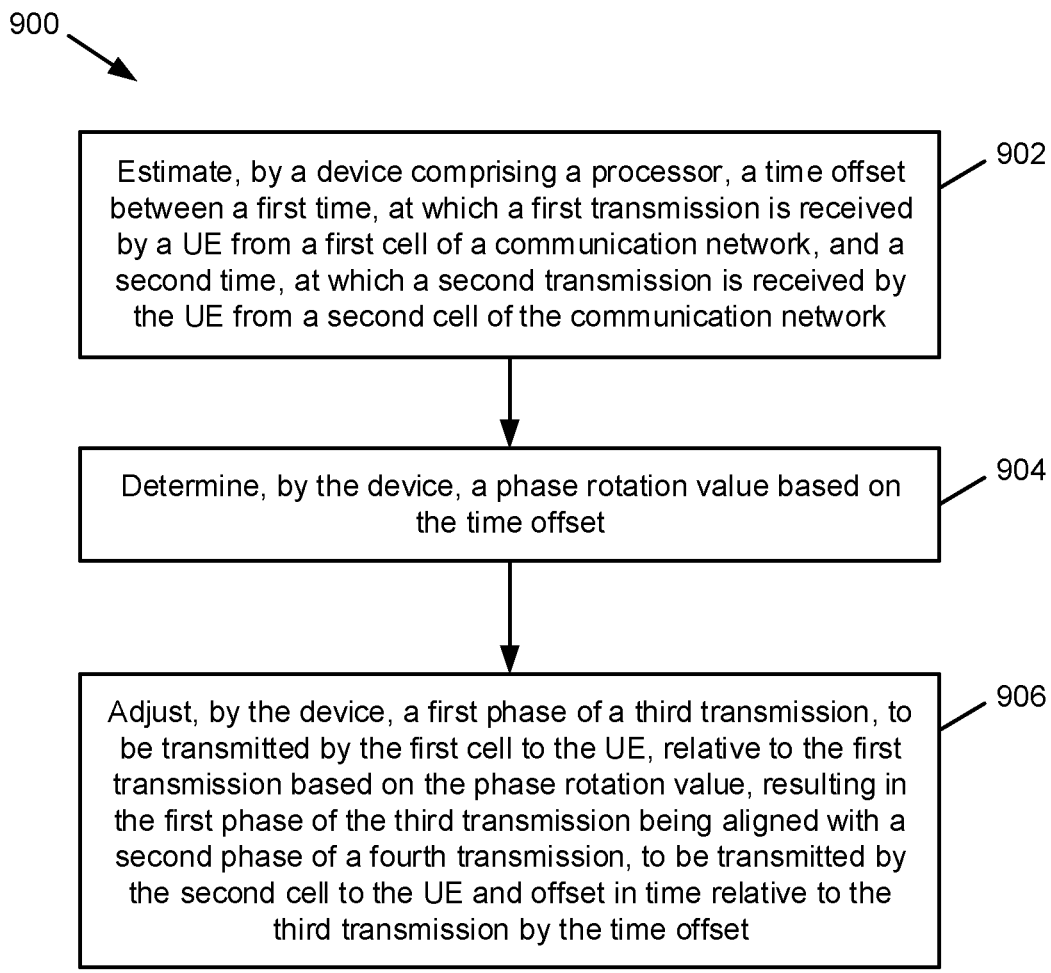
FIG. 9 is a flow diagram of a method that facilitates correction of downlink radio frame misalignment for CoMP by phase rotation in accordance with various implementations described herein.

Referring next to FIG. 9, a flow diagram of a method 900 that facilitates correction of downlink radio frame misalignment for COMP by phase rotation is illustrated. At 902, a device (e.g., a phase adjustment device 106) can estimate (e.g., by an offset estimation component 610) a time offset between a first time, at which a first transmission is received by a UE (e.g., UE 103) from a first cell (e.g., cell 102(1)) of a communication network, and a second time, at which a second transmission is received by the UE from a second cell (e.g., cell 102(2)) of the communication network.

At 904, the device can determine (e.g., by a phase rotation component 620) a phase rotation value based on the time offset estimated at 902.

At 906, the device can adjust (e.g., by the phase rotation component 620) a first phase of a third transmission, to be transmitted by the first cell to the UE, relative to the first transmission based on the phase rotation value determined at 906, resulting in the first phase of the third transmission being aligned with a second phase of a fourth transmission, to be transmitted by the second cell to the UE and offset in time relative to the third transmission by the time offset.

FIG. 9 as described above illustrates a method in accordance with certain embodiments of this disclosure. While, for purposes of simplicity of explanation, the method has been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 10:
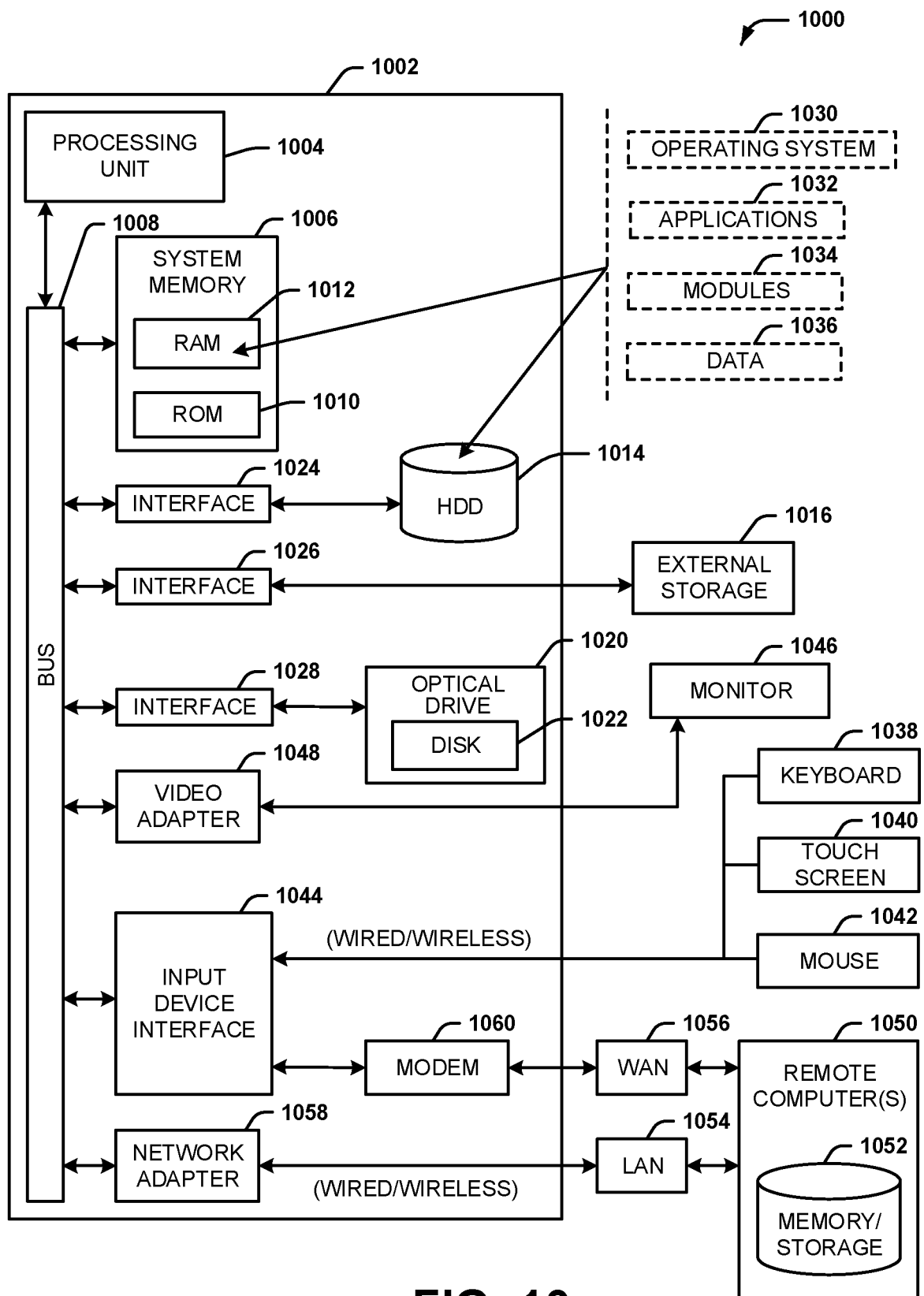
FIG. 10 is a diagram of an example computing environment in which various embodiments described herein can function.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD), a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a memory that stores executable components; and
a processor that executes the executable components stored in the memory, wherein the executable components comprise:
an offset estimation component that determines an estimated time offset between a first time, at which a user equipment receives a first transmission from a first cell of a communication network, and a second time, at which the user equipment receives a second transmission from a second cell of the communication network; and
a phase rotation component that adjusts a first phase of a third transmission, to be transmitted by the first cell to the user equipment, relative to the first transmission by a rotation amount determined as a function of the estimated time offset, resulting in the first phase of the third transmission being aligned with a second phase of a fourth transmission, to be transmitted by the second cell to the user equipment and offset in time relative to the third transmission by the estimated time offset.

2. The system of claim 1, wherein the first cell and the second cell transmit the first transmission and the second transmission, respectively, according to a coordinated multipoint transmission and reception (COMP) configuration, wherein the first cell is an assisting cell in the CoMP configuration, and wherein the second cell is a connected cell in the CoMP configuration.

3. The system of claim 1, wherein the rotation amount is a first rotation amount, wherein the third transmission is associated with a group of resource elements, and wherein the phase rotation component determines rotation amounts, comprising the first rotation amount, for respective ones of the group of resource elements.

4. The system of claim 1, wherein the executable components further comprise:
a modulation component that modulates the third transmission in response to the phase rotation component adjusting the first phase of the third transmission, resulting in a modulated transmission; and
a transmission component that transmits the modulated transmission to the user equipment.

5. The system of claim 1, wherein the third transmission is selected from a group of transmissions comprising a channel state information reference signal transmission and a physical downlink shared channel transmission.

6. The system of claim 1, wherein the user equipment is a first user equipment, wherein the rotation amount is a first rotation amount, and wherein the phase rotation component adjusts a third phase of a fifth transmission, to be transmitted by the first cell to a second user equipment at a same time as transmitting the third transmission to the first user equipment, relative to the first transmission by a second rotation amount that is not the first rotation amount.

7. The system of claim 6, wherein:
the estimated time offset is a first estimated time offset, the offset estimation component determines a second estimated time offset between a third time, at which the second user equipment receives a sixth transmission from the first cell, and a fourth time, at which the second user equipment receives a seventh transmission from a third cell of the communication network, and
the phase rotation component adjusts the third phase of the fifth transmission based on the second estimated time offset.

8. The system of claim 1, wherein the offset estimation component determines the estimated time offset based on a difference between a first distance, from the first cell to a position of the user equipment, and a second distance, from the second cell to the position of the user equipment.

9. The system of claim 1, wherein the offset estimation component determines the estimated time offset based on a difference between a third time, at which an uplink sounding reference signal transmitted from the user equipment is received at the first cell, and a fourth time, at which the uplink sounding reference signal is received at the second cell.

10. The system of claim 1, wherein the offset estimation component determines the estimated time offset based on a time misalignment report received from the user equipment in response to the user equipment receiving the first transmission and the second transmission.

11. A method, comprising:
estimating, by a device comprising a processor, a time offset between a first time, at which a first transmission is received by a user equipment from a first cell of a communication network, and a second time, at which a second transmission is received by the user equipment from a second cell of the communication network;
determining, by the device, a phase rotation value based on the time offset; and
adjusting, by the device, a first phase of a third transmission, to be transmitted by the first cell to the user equipment, relative to the first transmission based on the phase rotation value, resulting in the first phase of the third transmission being aligned with a second phase of a fourth transmission, to be transmitted by the second cell to the user equipment and offset in time relative to the third transmission by the time offset.

12. The method of claim 11, wherein the first cell and the second cell operate in a coordinated multipoint transmission and reception (COMP) configuration, wherein the first cell is an assisting cell in the CoMP configuration, and wherein the second cell is a connected cell in the CoMP configuration.

13. The method of claim 11, further comprising:
modulating, by the device in response to the adjusting of the first phase of the third transmission, the third transmission, the modulating resulting in a modulated transmission; and
transmitting, by the device, the modulated transmission to the user equipment.

14. The method of claim 11, wherein the user equipment is a first user equipment, wherein the phase rotation value is a first phase rotation value, and wherein the method further comprises:
adjusting, by the device, a third phase of a fifth transmission, to be transmitted by the first cell to a second user equipment at a same time as transmitting the third transmission to the first user equipment, relative to the first transmission based on a second phase rotation value that is not the first phase rotation value.

15. The method of claim 14, wherein the time offset is a first time offset, and wherein the method further comprises:

estimating, by the device, a second time offset between a third time, at which a sixth transmission is received by the second user equipment from the first cell, and a fourth time, at which a seventh transmission is received by the second user equipment from a third cell of the communication network; and determining, by the device, the second phase rotation value based on the second time offset.

16. A non-transitory machine-readable medium comprising computer executable instructions that, when executed by a processor, facilitate performance of operations, the operations comprising:

estimating a time offset between a first time, at which a first signal transmitted by a first cell of a communication network is received by a user equipment, and a second time, at which a second signal transmitted by a second cell of the communication network is received by the user equipment; and adjusting a first phase of a third signal, to be transmitted by the first cell to the user equipment, relative to the first signal by a phase offset determined based on the time offset, resulting in the first phase of the third signal being aligned with a second phase of a fourth signal, to be transmitted by the second cell to the user equipment and offset in time relative to the third signal by the time offset.

17. The non-transitory machine-readable medium of claim 16, wherein the first cell and the second cell operate in a coordinated multipoint transmission and reception (COMP) configuration, wherein the first cell is an assisting cell in the CoMP configuration, and wherein the second cell is a connected cell in the CoMP configuration.

18. The non-transitory machine-readable medium of claim 16, wherein the phase offset is a first phase offset, wherein the third signal is to be transmitted over respective resource elements, and wherein the adjusting of the first phase of the third signal comprises determining phase offsets, comprising the first phase offset, corresponding to respective ones of the resource elements.

19. The non-transitory machine-readable medium of claim 16, wherein the user equipment is a first user equipment, wherein the phase offset is a first phase offset, and wherein the operations further comprise:

adjusting a third phase of a fifth signal, to be transmitted by the first cell to a second user equipment in combination with transmitting the third signal to the first user equipment, relative to the first signal based on a second phase offset that is not the first phase offset.

20. The non-transitory machine-readable medium of claim 19, wherein the time offset is a first time offset, and wherein the operations further comprise:

estimating a second time offset between a third time, at which a sixth signal transmitted by the first cell is received by the second user equipment, and a fourth time, at which a seventh signal transmitted by a third cell of the communication network is received by the user equipment; and determining the second phase offset based on the second time offset.

* * * * *